(12) United States Patent
Bottcher et al.

(10) Patent No.: US 10,514,116 B2
(45) Date of Patent: Dec. 24, 2019

(54) PIPE CONNECTION FOR CONDUCTING A FLUID THAT IS UNDER PRESSURE

(71) Applicant: Siemens Aktiengesellschaft, Munich (DE)

(72) Inventors: Andreas Bottcher, Mettmann (DE); Hartwig Dumler, Cologne (DE); Werner Hesse, Haltern am See (DE); Boris Ferdinand Kock, Ratingen (DE); Patrick Lapp, Berlin (DE); Lars Otte, Reinfeld (DE); Falk Seidel, Hamminkeln (DE); Philipp Stapper, Essen (DE); Sascha Staring, Duisburg (DE); Gerd Weber, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 505 days.

(21) Appl. No.: 14/435,160

(22) PCT Filed: Oct. 8, 2013

(86) PCT No.: PCT/EP2013/070887
§ 371 (c)(1),
(2) Date: Apr. 11, 2015

(87) PCT Pub. No.: WO2014/060240
PCT Pub. Date: Apr. 24, 2014

(65) Prior Publication Data
US 2015/0292654 A1 Oct. 15, 2015

(30) Foreign Application Priority Data

Oct. 15, 2012 (DE) .......... 10 2012 218 727

(51) Int. Cl.
*F16L 19/00* (2006.01)
*F16L 19/025* (2006.01)
(Continued)

(52) U.S. Cl.
CPC ............ *F16L 19/00* (2013.01); *F16L 19/005* (2013.01); *F16L 19/025* (2013.01);
(Continued)

(58) Field of Classification Search
CPC ....... F16L 19/00; F16L 19/005; F16L 19/025; F16L 21/035; F16L 59/00; F16L 59/181; F16L 19/02; F16L 19/0243; F16L 59/12
(Continued)

(56) References Cited

U.S. PATENT DOCUMENTS 896,204 A * 8/1908 Glauber ................ F16L 17/035
277/622
904,673 A * 11/1908 Bideker .............. F16L 27/0812
137/801

(Continued)

FOREIGN PATENT DOCUMENTS

CN 2260941 Y 8/1997
CN 201141488 Y 10/2008
(Continued)

OTHER PUBLICATIONS

JP Notice of Allowance dated Oct. 26, 2016, for JP patent application No. 2015-536091.
(Continued)

*Primary Examiner* — Anna M Momper
*Assistant Examiner* — Fannie C Kee
(74) *Attorney, Agent, or Firm* — Beusse Wolter Sanks & Maire

(57) ABSTRACT

A pipe connection for conducting a fluid that is under pressure is provided, having two tubular connection parts for a conical clamping connection, which are screwed together by a union nut while one is inserted in the other, wherein each connection part has a conical sealing surface that contacts the other in a sealing manner and wherein an
(Continued)

annular groove is provided in one of the sealing surfaces. In order to enable the pipe connection also to conduct a fluid having cycling or varying temperature, the inner of the two connection parts has thermal insulation on the inside of the pipe at least in the axial segment of the sealing surface of the connection part, wherein the thermal insulation tube has a cam or a collar on the outer surface, which engages in a recess, which is axially bounded by the two connection parts.

15 Claims, 2 Drawing Sheets

(51) Int. Cl.
*F16L 59/18* (2006.01)
*F16L 21/035* (2006.01)
*F16L 59/00* (2006.01)

(52) U.S. Cl.
CPC ............ *F16L 21/035* (2013.01); *F16L 59/00* (2013.01); *F16L 59/181* (2013.01)

(58) Field of Classification Search
USPC ..... 285/45, 47, 55, 354–355, 386–387, 389, 285/123.3–123.5, 123.9, 9.4, 904
See application file for complete search history.

(56) References Cited

U.S. PATENT DOCUMENTS

| | | | | |
|---|---|---|---|---|
| 1,733,925 A | * | 10/1929 | Weatherhead, Jr. | F16L 19/005 285/334.5 |
| 1,939,242 A | * | 12/1933 | Thaheld | F16L 19/00 285/115 |
| 2,201,404 A | * | 5/1940 | Kreidel | F16L 19/10 285/341 |
| 2,390,103 A | * | 12/1945 | Johnson | F16L 19/005 285/116 |
| 2,412,664 A | * | 12/1946 | Wolfram | F16L 19/083 285/343 |
| 2,488,245 A | * | 11/1949 | Smith | F16L 21/04 138/175 |
| 3,885,595 A | | 5/1975 | Gibson et al. | |
| 3,913,949 A | * | 10/1975 | Senatro | F16L 39/00 285/14 |
| 4,458,926 A | * | 7/1984 | Williamson | F16L 19/025 285/332.3 |
| 4,685,703 A | * | 8/1987 | Brock | F16L 59/185 110/182.5 |
| 5,346,263 A | | 9/1994 | Huzenlaub et al. | |
| 6,634,352 B2 | * | 10/2003 | Maiello | F23J 13/04 126/307 R |
| 2004/0239110 A1 | | 12/2004 | Pedersen et al. | |

FOREIGN PATENT DOCUMENTS

| | | | | |
|---|---|---|---|---|
| CN | 201297461 Y | 8/2009 | | |
| CN | 101994486 A | 3/2011 | | |
| DE | 1960933 U | 5/1967 | | |
| DE | 9106441 U1 | 9/1991 | | |
| DE | 4104711 A1 | 8/1992 | | |
| DE | 202011104255 U | 11/2011 | | |
| EP | 0294088 A2 | * 12/1988 | ............... | E21B 7/04 |
| EP | 0995937 A2 | * 4/2000 | ............... | F16L 19/02 |
| EP | 2557346 A1 | 2/2013 | | |
| GB | 2254388 A | 1/1995 | | |
| JP | S50107524 A | 8/1975 | | |
| JP | S61129991 U | 8/1986 | | |
| RU | 2069286 C1 | 11/1996 | | |
| WO | WO 03021143 A1 | 3/2003 | | |
| WO | 2012048535 A1 | 4/2012 | | |

OTHER PUBLICATIONS

RU Notice of Allowance dated Jun. 6, 2017, for RU patent application No. 2015118131.

* cited by examiner

PIPE CONNECTION FOR CONDUCTING A FLUID THAT IS UNDER PRESSURE

CROSS REFERENCE TO RELATED APPLICATIONS

This application is the US National Stage of International Application No. PCT/EP2013/070887 filed Oct. 8, 2013, and claims the benefit thereof. The International Application claims the benefit of German Application No. DE 102012218727.8 filed Oct. 15, 2012. All of the applications are incorporated by reference herein in their entirety.

FIELD OF INVENTION

The invention relates to a pipe connection for conducting a fluid that is under pressure, comprising two tubular connection pieces which are screwed together by means of a union nut, being plugged one into the other in the manner of a cone clamping connection, wherein each connection piece has a conical sealing face which bears in a sealing manner against the other of the two sealing faces.

BACKGROUND OF INVENTION

Pipe connections of the type mentioned in the introduction are very well known from the prior art. For example, DE 1 960 933 U discloses a connection piece, as part of such a pipe connection, which can be welded onto the end of a pipe. In that context, the known connection piece is plugged into an at least partially complementary connection piece, wherein the two connection pieces are screwed together by means of a union nut. In that context, the conical sealing faces are pressed against one another, resulting in a sealed pipe connection. The pipe connection is generally used for conducting hydraulic oil. However, it has been found that such connections can start to leak when used to conduct a fluid with a varying temperature.

A further solution from the prior art is disclosed in DE 4104711 A1, which describes a coupling for vacuum-insulated pipes. Here, a conical connection piece is securely connected to a line terminating pipe. The line terminating pipe has a constant vacuum. A further, mating connection piece of the coupling is connected to the conical connection piece with the aid of a union nut. However, this has the disadvantage that, in the event of large variations in temperature, a solid connection between the conical connection piece and the line terminating pipe can lead to material stresses and damage to these components, which in turn can lead to undesirable leaks. However, in the event of material separation of the conical connection piece from the line pipe, there is the risk of insufficient fixing of the line pipe with respect to the conical connection piece, resulting in only insufficient thermal insulation.

SUMMARY OF INVENTION

The invention therefore has an object of avoiding these known drawbacks of the prior art, and of proposing the provision of a pipe connection for conducting a fluid that is under pressure, which connection should be durably and reliably sealed despite conducting a fluid with changing temperature.

This object upon which the invention is based is achieved with a pipe connection which is described herein.

It is provided according to aspects of the invention that the inner connection piece has, at least in the axial section of its sealing face, a thermal barrier inside the pipe—that is to say in the pipe interior—which barrier takes the form of a thermal barrier pipe.

The invention is based on the knowledge that, when the temperature of the fluid varies, the thermal reaction of the inner connection piece is faster than that of the outer of the two connection pieces. This can have the result that, in the case of dropping temperature gradients, the cone of the inner sealing face shrinks faster than the cone of the outer sealing face. This can on one hand lead to leaks and on the other hand reduce the breakaway torque of the union nut. The invention aims to match the thermal reaction of the inner cone to that of the outer cone. For that reason, a thermal barrier is provided in the axial section of the sealing face of the inner cone, on the inner pipe face. As a consequence, the input of heat or the extraction of heat from the fluid into the cone material or, respectively, from the cone material into the fluid is delayed, as compared with the solution according to the prior art. It is thus possible for the pipe connection also to be used for thermally transient uses without the risk of a leak at the pipe connection.

Moreover, according to aspects of the invention, the thermal barrier takes the form of a thermal barrier pipe. In addition, the thermal barrier pipe has, on its outer face, a protuberance or, as the case may be, an endless circumferential collar which engages in a recess which is delimited axially by the two connection pieces. This makes it possible to prevent the thermal barrier pipe from moving axially along the connection pieces, such that the predefined position of the thermal barrier pipe cannot be changed. Particular advantages are given in that context to a configuration in which the thermal barrier pipe is at a slight distance—as seen radially—from the inner face of the inner connection piece. This prevents heat being conducted directly via the thermal barrier pipe into the cone of the inner sealing face.

It is advantageously provided that the graphite is arranged in an annular groove which is provided in one of the two sealing faces. The two mutually opposite conical sealing faces of the two cones bear against one another on either side of the annular groove, such that one can assume an enclosure in combination with a compression of the graphite, such that despite the graphite being used at high temperatures, for example 200° C. or 300° C., the sealant remains in the desired location and is not removed. At the same time, graphite has the advantage of compensating for relatively small-scale damage in the sealing face, which would otherwise lead to a loss of sealing. Advantageously, the annular groove is entirely filled with graphite.

Consequently, there is proposed a cone clamping connection which is decoupled from the temperature of the conducted fluid, which connection is sealed with the aid of an additional enclosed sealing element—the graphite.

Thus, the existing cone clamping connections are strengthened to also convey fluids—whether gaseous or liquid—in both the static and the transient state, wherein the temperature difference between the fluid and the environment on one hand can be large and on the other hand can vary. For example, it is now also possible to use the pipe connection in the context of very high ambient temperatures. In the case of pipe connections of fuel lines of static gas turbines, the ambient temperatures can be as high as ~420° C. and fluid temperatures can be in the region of 20° C. (or also 230° C. in the case of fuel preheating). This results in a temperature difference of 400 K or 190 K in static operation. In the transient case, for example when the pipe connection is heated up and conveys no fluid and then the supply of fluid takes place, or if the environment and therefore also the pipe connection heats up to a static temperature and the comparatively cold fluid flows in the line, there occurs a differential, time-limited expansion of the connection pieces, whose seal can be guaranteed by the thermally decoupled sealing fit and by the graphite seal, even for the heating-up time of the surroundings which, experience tells us, can be approximately 200 seconds.

It is provided, according to a further embodiment of the invention, that at least one end of the thermal barrier pipe is formed as a close sliding fit, in particular both ends are formed as close sliding fits. A close sliding fit takes the form, in this context in particular, of a shaped portion of the thermal barrier pipe, which advantageously largely independently of temperature influences can ensure a contact between the thermal barrier pipe and the connection piece without this giving rise to material-induced damage in the region of the contact. The stresses arising in the region of the contact are accordingly taken up by the material of the shaped portion without, however, this suffering a fracture. The shaped portion is in this context advantageously a radial, terminal widening of the thermal barrier pipe, which in particular can also be of conical design. No further attachment points are provided in the region of the close sliding fit.

Instead of a thermal barrier pipe, the thermal barrier can also take the form of a thermal barrier coating or of a thermal barrier coating system on the inner face of the pipe wall guiding the fluid.

More advantageously, the cavity arranged between the inner pipe face of the inner connection piece and the thermal barrier pipe is sealed so as to prevent ingress of fluid.

According to a further advantageous configuration, the breakaway torque of the union nut can be further increased if a locknut is used to prevent the union nut from coming loose. In that context, it is sufficient that the locknut is narrower than a conventional screw nut. When using a locknut, it is even possible to also make the union nut axially shorter than normal.

Further advantages and features of the invention will be explained in more detail with reference to a FIGURE.

DETAILED DESCRIPTION OF INVENTION

Figure 1:
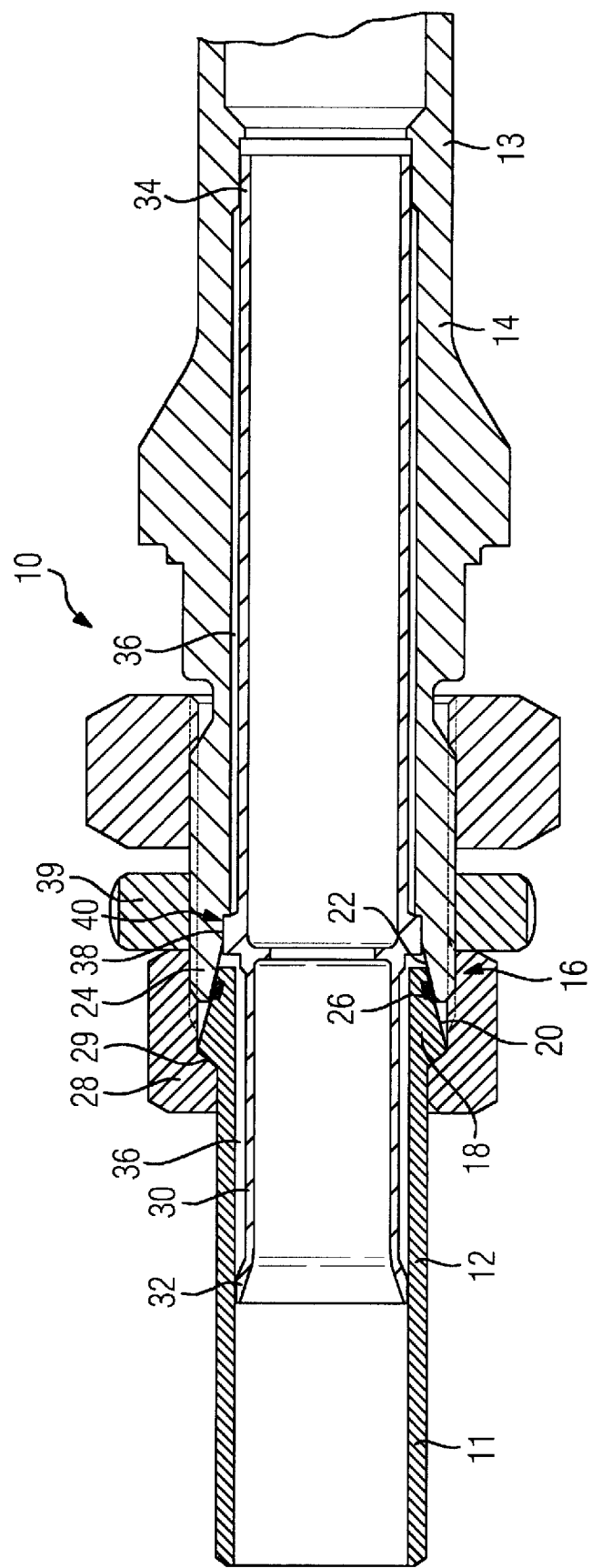
FIG. 1 shows a longitudinal section through a pipe connection including a thermal barrier pipe for conducting a fluid that is under pressure.

FIG. 1 shows, in longitudinal section, a pipe connection 10 for conducting a fluid that is under pressure. In that context, the pipe connection 10 comprises two connection pieces 12, 14 which are connected for a cone clamping connection 16. To that end, the first connection piece 12 has a cone 18 with an outward-oriented conical sealing face 20. The second connection piece 14 has, at an inclination which corresponds to the sealing face 20, an also conical sealing face 22, as part of a cone 24. The cone 24 forms the outer cone and the cone 18 forms the inner cone of the cone clamping connection.

In the sealing face 20 there is provided an endless circumferential annular groove 26 for receiving graphite as sealant. The two connection pieces 12, 14 are connected to one another with the aid of a union nut 28. Specifically, to that end, the union nut 28 is screwed onto the second connection piece 14, wherein the union nut 28 presses a conical shaft collar 29, a rearward part of the cone 18 of the first connection piece 12, in the direction of the second connection piece 14. The two connection pieces 12, 14 are tubular, such that in their interiors the fluid, for example a hydraulic oil but also a gaseous or liquid fuel, can be conveyed from one pipe section 11 into a second pipe section 13.

A thermal barrier pipe 30 is arranged inside the pipe connection 10. The thermal barrier pipe 30 is arranged at least in that axial section of the pipe connection 10 at which the inner connection piece in this case the connection piece 12—bears by means of its sealing face 20 against the other sealing face 22. However, according to the exemplary embodiment, the thermal barrier pipe is elongated axially in both directions, wherein the ends 32, 34 of the thermal barrier pipe 30, where possible, bear in a sealing manner against the inner faces of the pipe sections 11, 13, so as to avoid ingress of the fluid into an interspace 36 between the thermal barrier pipe 30 and the inner faces of the pipe sections 11, 13. In this case, that end 32 of the thermal barrier pipe 30 which is assigned to the connection piece 12 takes the form of a close sliding fit. In addition, a collar 38 is provided on the outer lateral surface of the thermal barrier pipe 30, which is axially fixed 40 between the two connection pieces 12, 14. A locknut 39 prevents the union nut 28 from coming loose.

Figure 2:
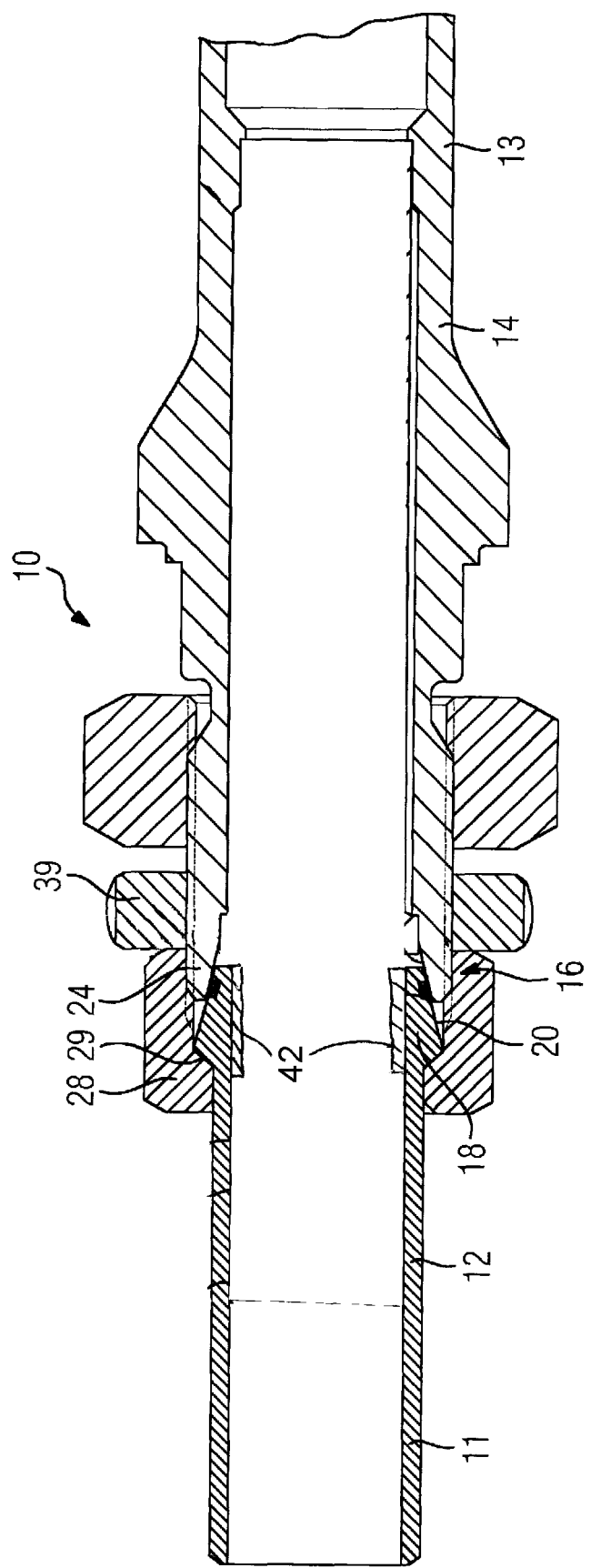
FIG. 2 shows a longitudinal section through a pipe connection including a thermal barrier for conducting a fluid that is under pressure.

Instead of a thermal barrier pipe 30, there is of course also the possibility of applying a thermal barrier coating 42, as illustrated in FIG. 2, to those inner faces of the pipe connection 10 which according to the prior art were hitherto in direct contact with the fluid to be conducted, in order to slow the transfer of heat between the pipe material or the cone material and the fluid, when the temperature of the fluid changes.

In summary, the invention indicates a pipe connection 10 for conducting a fluid that is under pressure, comprising two tubular connection pieces 12, 14 which are screwed together by means of a union nut 28, being plugged one into the other for a cone clamping connection 16, wherein each connection piece 12, 14 has a conical sealing face 20, 22 which bears in a sealing manner against the other, and wherein an annular groove 26 is provided in one of the sealing faces 20, 22. In order to provide a sealed pipe connection 10 even for conducting a fluid with changing or varying temperature, it is proposed that a graphite band, which additionally seals the connection 10, is provided in the annular groove 26 and advantageously completely fills the annular groove 26, and that the inner of the two connection pieces 12 has, at least in the axial section of its sealing face 20, a thermal barrier inside the pipe, advantageously in the form of a thermal barrier pipe 30.

The invention claimed is:

1. A pipe connection for conducting a fluid that is under pressure, comprising
two pipes which are screwed together by means of a union nut, being plugged one into the other in a cone clamping connection,
wherein each pipe has a conical sealing face which respectively bears against the other of the two sealing faces,
wherein an inner one of the pipes has, at least in an axial section of a sealing face, a thermal barrier pipe inside the inner one of the pipes with an interspace between the thermal barrier pipe and the inner one of the pipes along the axial section, wherein the thermal barrier pipe has, on a lateral surface, a protuberance or a collar which engages in a recess which is delimited axially by the two pipes.

2. The pipe connection as claimed in claim 1, wherein at least one end of the thermal barrier pipe is formed as a close sliding fit.

3. The pipe connection as claimed in claim 2, wherein both ends are formed as close sliding fits.

4. The pipe connection as claimed in claim 1, wherein the union nut is prevented from coming loose.

5. The pipe connection as claimed in claim 4, wherein the union nut is locked.

6. The pipe connection as claimed in claim 1, further comprising
a graphite-containing seal arranged in an annular groove in one of the two sealing faces.

7. A method of using a pipe connection as claimed in claim 1, comprising
conducting a fluid with a varying temperature or whose temperature deviates, at least briefly, from the temperature of the pipe connection by more than 100 K.

8. A pipe connection comprising:
two pipe sections joined by a cone clamping connection to define a passage for a fluid;
a first of the pipe sections comprising an outward-oriented conical sealing face and a second of the pipe sections comprising an inward-oriented conical sealing face, the respective sealing faces urged against each other along an axial section of the passage forming the cone clamping connection; and
a thermal barrier effective to slow a transfer of heat disposed between the passage and the first of the pipe sections along the axial section of the passage;
wherein the thermal barrier comprises a thermal barrier pipe; and
further comprising an interspace between the thermal barrier pipe and the first of the pipe sections along the axial section of the passage.

9. The pipe connection of claim 8, further comprising a collar on an outer surface of the thermal barrier pipe which is axially fixed between the two pipe sections.

10. The pipe connection of claim 8, further comprising a close sliding fit formed at opposed axial ends of the thermal barrier pipe to limit ingress of the fluid into the interspace.

11. The pipe connection of claim 8, further comprising an annular groove formed in at least one of the conical sealing faces.

12. The pipe connection of claim 11, further comprising a sealing element disposed in the annular groove.

13. The pipe connection of claim 12, wherein the sealing element comprises graphite.

14. A pipe connection comprising:
two pipe connection pieces joined by a cone clamping arrangement to define a passage for a fluid;
a first of the pipe connection pieces comprising an outward-oriented conical sealing face and a second of the pipe connection pieces comprising an inward-oriented conical sealing face, the respective sealing faces urged against each other along an axial section of the passage by the cone clamping arrangement;
a thermal barrier pipe disposed within the passage and separated from the first of the pipe connection pieces by an interspace along the axial section of the passage; and
a radial widening of the thermal barrier pipe formed proximate at least one end of the thermal barrier pipe effective to establish a contact between the thermal barrier pipe and the first of the pipe connection pieces.

15. The pipe connection of claim 14, further comprising a collar on a surface of the thermal barrier pipe which is axially delimited between the two pipe connection pieces.

* * * * *